United States Patent
Miyazaki et al.

(10) Patent No.: US 9,230,217 B2
(45) Date of Patent: Jan. 5, 2016

(54) FORGETTING TO TURN OFF POWER DETECTION APPARATUS, FORGETTING TO TURN OFF POWER DETECTION PROGRAM, FORGETTING TO TURN OFF POWER DETECTION METHOD AND DETECTION SYSTEM

(75) Inventors: Tomotaka Miyazaki, Tokyo (JP); Kazuo Kimura, Tokyo (JP); Isamu Saitou, Tokyo (JP); Naohiko Murata, Tokyo (JP); Daigo Yoshii, Tokyo (JP)

(73) Assignees: KABUSHIKI KAISHA TOSHIBA, Tokyo (JP); TOSHIBA SOLUTIONS CORPORATION, Tokyo (JP)

( * ) Notice: Subject to any disclaimer, the term of this patent is extended or adjusted under 35 U.S.C. 154(b) by 244 days.

(21) Appl. No.: 14/127,588

(22) PCT Filed: Aug. 30, 2012

(86) PCT No.: PCT/JP2012/071997
§ 371 (c)(1),
(2), (4) Date: Dec. 19, 2013

(87) PCT Pub. No.: WO2013/031886
PCT Pub. Date: Mar. 7, 2013

(65) Prior Publication Data
US 2015/0178630 A1    Jun. 25, 2015

(30) Foreign Application Priority Data
Aug. 31, 2011    (JP) .................................. 2011-189371

(51) Int. Cl.
*G06F 17/00* (2006.01)
*G06N 5/02* (2006.01)
(Continued)

(52) U.S. Cl.
CPC ................ *G06N 5/047* (2013.01); *G08B 21/24* (2013.01)

(58) Field of Classification Search
None
See application file for complete search history.

(56) References Cited

U.S. PATENT DOCUMENTS 7,503,338 B2 * 3/2009 Harrington .......... A01G 25/162
                                                137/355.16
8,132,592 B2 * 3/2012 Harrington .......... A01G 25/162
                                                137/355.2
(Continued)

FOREIGN PATENT DOCUMENTS

| JP | 3-287039 A | 12/1991 |
| JP | 10-208173 A | 8/1998 |

(Continued)

OTHER PUBLICATIONS

Design and implementation of wireless power monitoring system for public buildings Shu-ping Le; Hong Zeng; Jian Qiu; Song Zhang Electronic and Mechanical Engineering and Information Technology (EMEIT), 2011 International Conference on Year: 2011, vol: 1 pp. 291-294, DOI: 10.1109/EMEIT.2011.6022927 Referenced in: IEEE Conference Publications.*

(Continued)

*Primary Examiner* — Michael B Holmes
(74) *Attorney, Agent, or Firm* — Oblon, McClelland, Maier & Neustadt, L.L.P.

(57) ABSTRACT

According to one embodiment, a forgetting to turn off power detection apparatus includes an outgoing determination unit that creates a power usage pattern based on electric energy that is calculated from past electric energy data in a consumer equipment, and determines whether or not a consumer has gone outside based on the power usage pattern. The forgetting to turn off power detection apparatus of the embodiments includes a forgetting to turn off power detection unit that receives current electric energy data in the consumer equipment, and detects forgetting to turn off power of an electric equipment of the consumer equipment based on the received electric energy data when the outgoing determination unit determines that the consumer has gone outside.

10 Claims, 15 Drawing Sheets

(51) Int. Cl.
*G06N 5/04* (2006.01)
*G08B 21/24* (2006.01)

(56) References Cited

U.S. PATENT DOCUMENTS

| | | | | |
|---|---|---|---|---|
| 8,674,823 | B1* | 3/2014 | Contario | H02J 1/10 340/333 |
| 8,739,815 | B2* | 6/2014 | Harrington | A01G 5/162 137/355.2 |
| 2004/0231723 | A1* | 11/2004 | Harrington | A01G 25/162 137/355.2 |
| 2009/0301573 | A1* | 12/2009 | Harrington | A01G 25/162 137/355.2 |
| 2012/0168003 | A1* | 7/2012 | Harrington | A01G 25/162 137/355.2 |
| 2015/0178630 | A1* | 6/2015 | Miyazaki | G06N 5/047 706/48 |

FOREIGN PATENT DOCUMENTS

| | | |
|---|---|---|
| JP | 2001-357477 A | 12/2001 |
| JP | 2003-006337 A | 1/2003 |
| JP | 2004-226223 A | 8/2004 |
| JP | 2005-174058 A | 6/2005 |
| JP | 2007-132804 A | 5/2007 |
| JP | 2007-281857 A | 10/2007 |
| JP | 2009-300368 A | 12/2009 |

OTHER PUBLICATIONS

Vibration monitoring for diagnosis of electrical equipment's faults Iorgulescu, M.; Beloiu, R.; Popescu, M.O. Optimization of Electrical and Electronic Equipment (OPTIM), 2010 12th International Conference on Year: 2010 pp. 493-499, DOI: 10.1109/OPTIM.2010. 5510332 Referenced in: IEEE Conference Publications.*
In-Water Plasma Generation on a Liquid Wall Using a Compact Device and Dedicated Power Supply Imai, S.-I.; Kumagai, H.; Iwata, M.; Onodera, M.; Suzuki, M.-A. Plasma Science, IEEE Transactions on Year: 2015, vol. 43, Issue: 7 pp. 2166-2173, DOI: 10.1109/TPS. 2015.2429571 Referenced in: IEEE Journals & Magazines.*
Extended European Search Report issued Apr. 21, 2015 in Patent Application No. 12827279.6.
Japanese Search Report issued Oct. 30, 2012 in PCT/JP2012/071997.
Office Action issued Sep. 10, 2013 in Japanese Patent Application No. 2012-542286 (with English language translation).

* cited by examiner

FIG. 3

| CONSUMER ID | DATE AND TIME | INTEGRAL ELECTRIC ENERGY |
|---|---|---|

FIG. 4

(CONSUMER C)

(CONSUMER B)

(CONSUMER A)

| DATE | TIME | INTEGRAL ELECTRIC ENERGY | POWER CONSUMPTION (30 MINUTES) |
|---|---|---|---|
| 2011/04/01 | 6:00 | 351,600 | 80 |
| 2011/04/01 | 6:30 | 35 2,540 | 940 |
| 2011/04/01 | 7:00 | 353,740 | 1,200 |
| 2011/04/01 | 7:30 | 354,190 | 450 |
| 2011/04/01 | 8:00 | 354,640 | 450 |
| 2011/04/01 | 8:30 | 355,090 | 450 |
| 2011/04/01 | 9:00 | 355,170 | 80 |
| 2011/04/01 | 9:30 | 355,250 | 80 |
| 2011/04/01 | 10:00 | 355,330 | 80 |
| : | : | : | : |
| : | : | : | : |

FORGETTING TO TURN OFF POWER DETECTION APPARATUS, FORGETTING TO TURN OFF POWER DETECTION PROGRAM, FORGETTING TO TURN OFF POWER DETECTION METHOD AND DETECTION SYSTEM

CROSS REFERENCE TO RELATED APPLICATION

This application is based upon and claims the benefit of propriety from Japanese Patent Application Number 2011-189371, Aug. 31, 2011, the entire contents of which are incorporated herein by reference.

FIELD

Embodiments described herein relate generally to a technique for determining forgetting to turn off power of an electrical household appliance when an energy consumer (hereafter refer to "consumer" as appropriate) stays out.

BACKGROUND

In order to prevent forgetting to turn off power of an electrical household appliance during staying out, a consumer uses a timer off function installed in an electrical household appliance itself, a timer off function separately provided for a power supply outlet, for example, of an electrical household appliance, and the like. A consumer provides a controller such as a home server in a consumer's house and monitors operation states of electrical household appliances by the controller.

BRIEF DESCRIPTION OF DRAWINGS

FIG. 3 is a diagram illustrating an example of electric energy data acquired by the forgetting to turn off power detection apparatus of the embodiment.

FIG. 4 is a diagram illustrating an example of a data configuration of energy usage data.

DETAILED DESCRIPTION

In general, according to one embodiment, the forgetting to turn off power detection apparatus in the embodiments includes an outgoing determination unit that creates a power usage pattern based on electric energy that is calculated from past electric energy data in a consumer equipment, and determines whether or not a consumer has gone outside based on the power usage pattern. The forgetting to turn off power detection apparatus in the embodiments includes a forgetting to turn off power detection unit that receives current electric energy data in the consumer equipment, and detects forgetting to turn off power of an electric equipment of the consumer equipment based on the received electric energy data when the outgoing determination unit determines that the consumer has gone outside.

The embodiments will be explained by reference to the accompanying drawings below. At first, a system including a forgetting to turn off power detection apparatus of the embodiments will be explained. Note that an operation of the forgetting to turn off power detection apparatus 10 of the embodiments of the invention will be explained in detail in the explanation about forgetting to turn off power apparatus.

Figure 1:
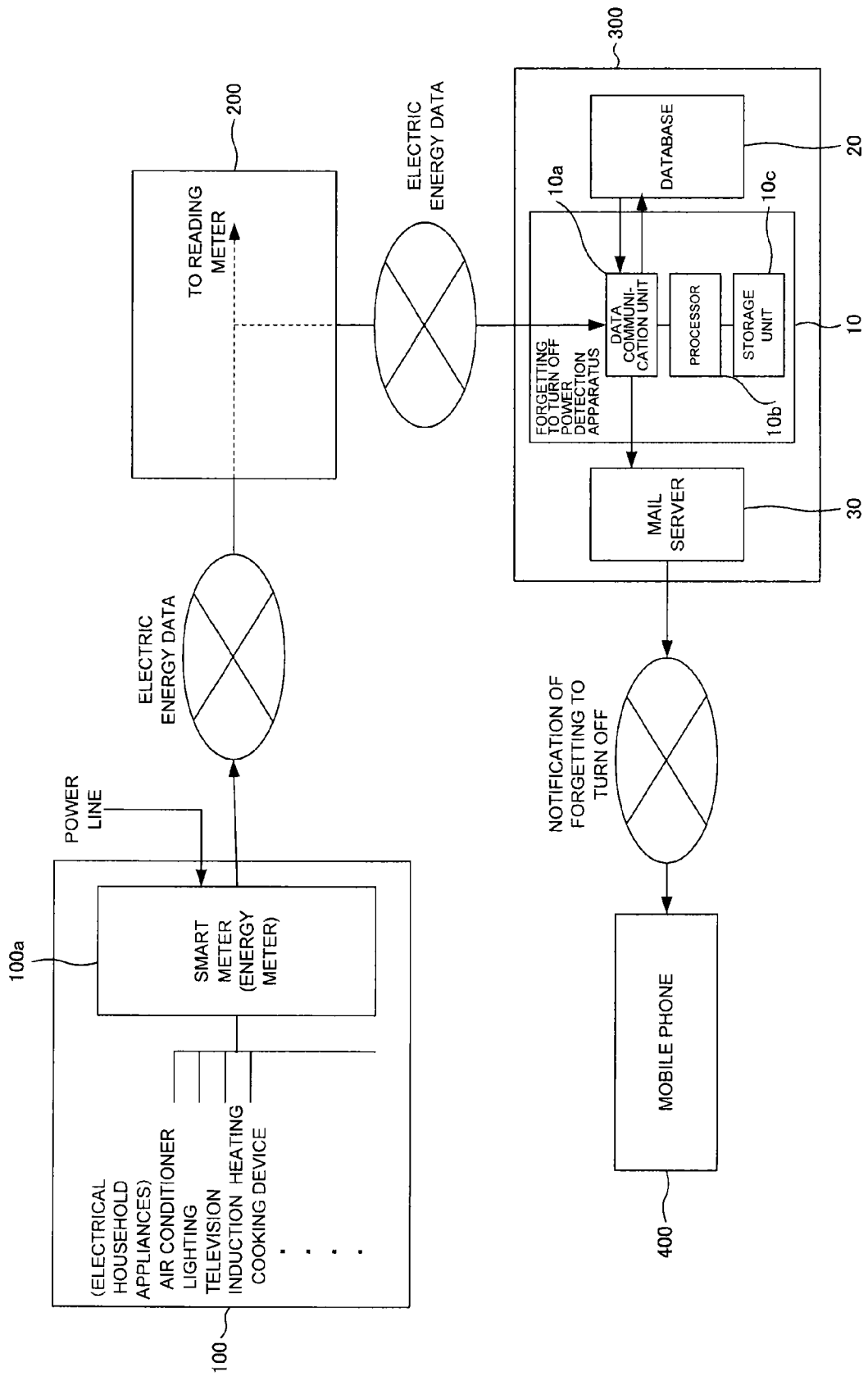
FIG. 1 is a diagram illustrating a system including a consumer's home having a smart meter, an electric power supplier, a service provider, and a mobile phone owned by the consumer.

FIG. 1 is a diagram illustrating a system including a consumer's home 100 having a smart meter 100a, an electric power supplier 200, a service provider 300, and a mobile phone 400 owned by the consumer. The system illustrated in FIG. 1 includes a consumer's home 100 having a smart meter 100a, an electric power supplier 200, a service provider 300, and a mobile phone 400 owned by the consumer. The smart meter 100a measures electric energy data used by electrical household appliances at a predetermine interval, and transmits it to the electric power supplier 200 via a network of an electric power company and the like. The electric power supplier 200 uses the received electric energy data of the consumer's home 100 in order to read a meter mainly. The electric power supplier 200 transmits that data to the contracted service provider 300 via a communication network.

The service provider 300 acquires, by the forgetting to turn off power detection apparatus 10, electric energy data transmitted to the forgetting to turn off power detection apparatus 10 owned by the electric power supplier 200, via the communication network, and stores that into a database 20. The forgetting to turn off power detection apparatus 10, when detecting forgetting to turn off power of an electrical household appliance in the consumer's home 100, notifies such matter to the mobile phone 400 of the consumer via a mail server 30 by e-mail.

Next, the forgetting to turn off power detection apparatus 10 of the embodiments will be explained. The hardware configuration of the forgetting to turn off power detection apparatus 10 of the embodiments is implemented by a computer as illustrated in FIG. 1 and includes a data communication unit 10a, a processor 10b and a storage unit 10c.

The data communication unit 10a communicates with the electric power supplier 200 and the database 20. The processor 10b operates based on a program and the like stored in the storage unit 10c to implement functions of forgetting to turn off power detection apparatus 10.

The functional configuration of the forgetting to turn off power detection apparatus 10 of the embodiments will be explained.

Figure 2:
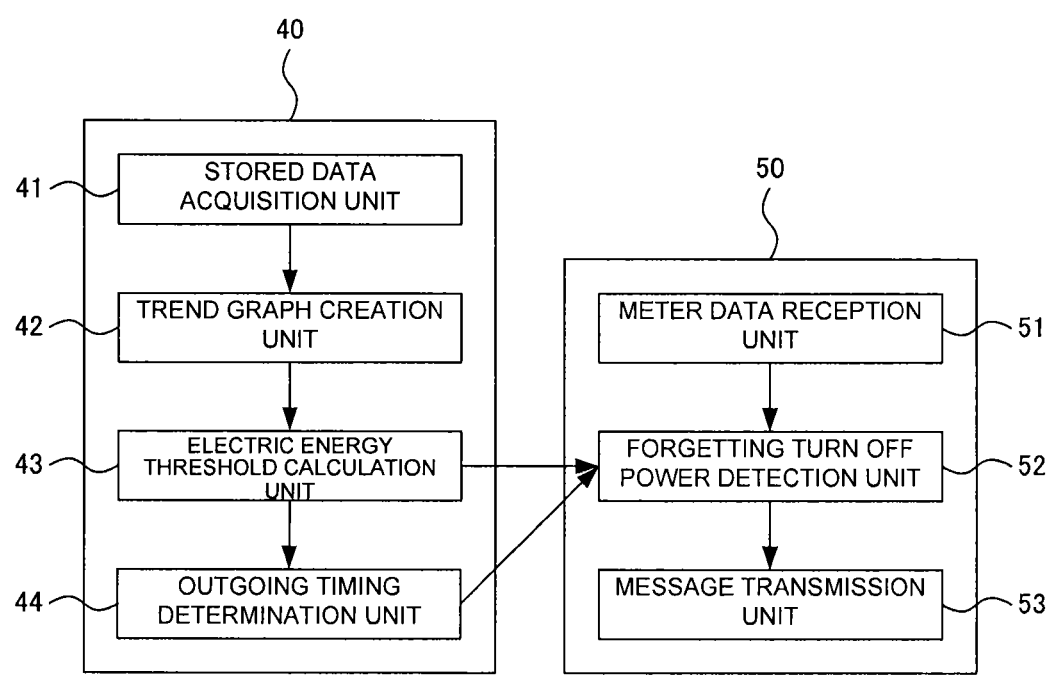
FIG. 2 is a block diagram illustrating a functional configuration of a forgetting to turn off power detection apparatus of an embodiment.

FIG. 2 is a block diagram illustrating a functional configuration of the forgetting to turn off power detection apparatus 10 of the embodiments. FIG. 3 is a diagram illustrating an example of electric energy data acquired by the forgetting to turn off power detection apparatus 10 of the embodiments. FIG. 4 is a diagram illustrating an example of a data configuration of energy usage data.

The forgetting to turn off power detection apparatus 10 includes an outgoing determination unit 40 and a forgetting to turn off power detection unit 50. The outgoing determination unit 40 includes a stored data acquisition unit 41, a trend graph creation unit 42, an electric energy threshold calculation unit 43 and an outgoing timing determination unit 44. The stored data acquisition unit 41 acquires, as illustrated in FIG. 3 for example, electric energy data (stored data) that is stored electric energy used in the consumer's home 100 in the past time, from database 20. As illustrated in FIG. 3, the electric energy data includes a consumer ID uniquely assigned to each consumer, date and time having a date and a time when the electric energy is measured, and integral electric energy (Wh) accumulated by the smart meter 100a of the consumer's home 100. The stored data acquisition unit 41 creates, as illustrated in FIG. 4 for example, data configuration for each consumer including data and time, integral electric energy, and power consumption (electric energy) from the stored data illustrated in FIG. 3. Since the electric energy data includes integral electric energy as illustrated in FIG. 3, the power consumption (electric energy) illustrated in FIG. 4 may be calculated by subtracting previous integral electric energy from current integral electric energy.

The trend graph creation unit 42 creates a power usage pattern (a trend graph) based on the data configuration illustrated in FIG. 4. The electric energy threshold calculation unit 43 calculates an electric energy threshold for detecting whether or not the turning off power is forgotten by the forgetting turn off power detection unit 52 that will be described later, based on the power usage pattern created by the trend graph creation unit 42, and transmits the calculated electric energy threshold to the forgetting turn off power detection unit 52. The outgoing timing determination unit 44 determines a timing (time) when the consumer has gone outside based on the power usage pattern created by the trend graph creation unit 42. The outgoing timing determination unit 44 transmits the determined outgoing timing to the forgetting turn off power detection unit 52 when it is determined that the consumer has gone outside.

The forgetting to turn off power detection unit 50 includes a meter data reception unit 51, a forgetting turn off power detection unit 52 and a message transmission unit 53. The meter data reception unit 51 receives electric energy data in the current consumer's home 100 from the consumer's home 100 via the electric power supplier 200. The forgetting turn off power detection unit 52 receives current electric energy data in the consumer's home 100, and detects forgetting to turn off power of an electrical household appliance (electric equipment) in the consumer's home 100 based on the received electric energy data when the outgoing determination unit 40 determines that the consumer has gone outside. The message transmission unit 53 transmits a message indicating the forgetting to turn off power of the electrical household appliance to the mobile phone 400 owned by the consumer via the mail server 30. Note that those functions are implemented by the processor 10b.

Next, an operation of the forgetting to turn off power detection apparatus 10 will be explained. In the following description, a determination operation of outgoing timing and a detection operation of forgetting to turn off power are separately explained.

(Determination Operation of Outgoing Timing)

Figure 5:
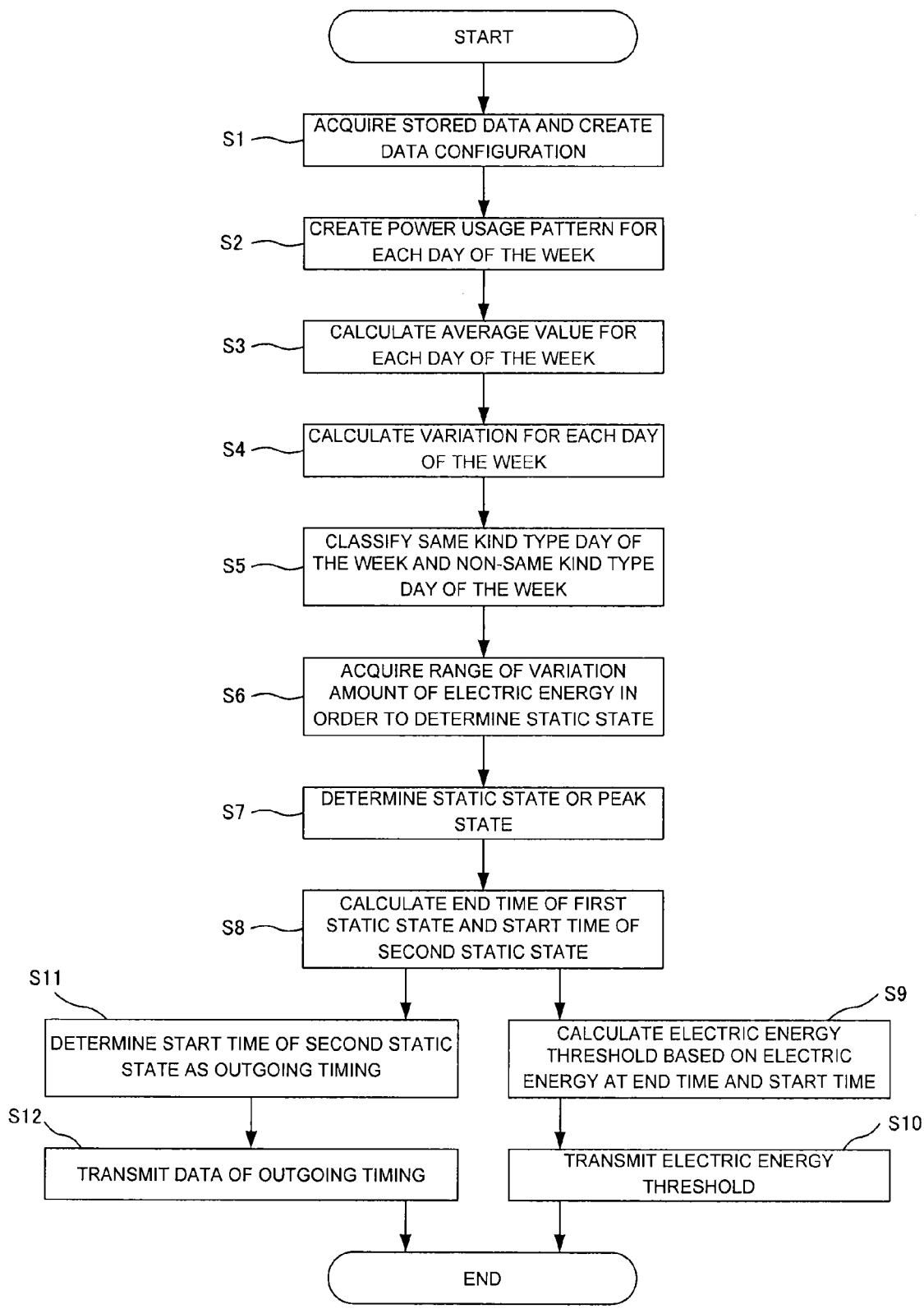
FIG. 5 is a flowchart illustrating an operation for determining an outgoing timing of the forgetting to turn off power detection apparatus of the embodiment.
Figure 6:
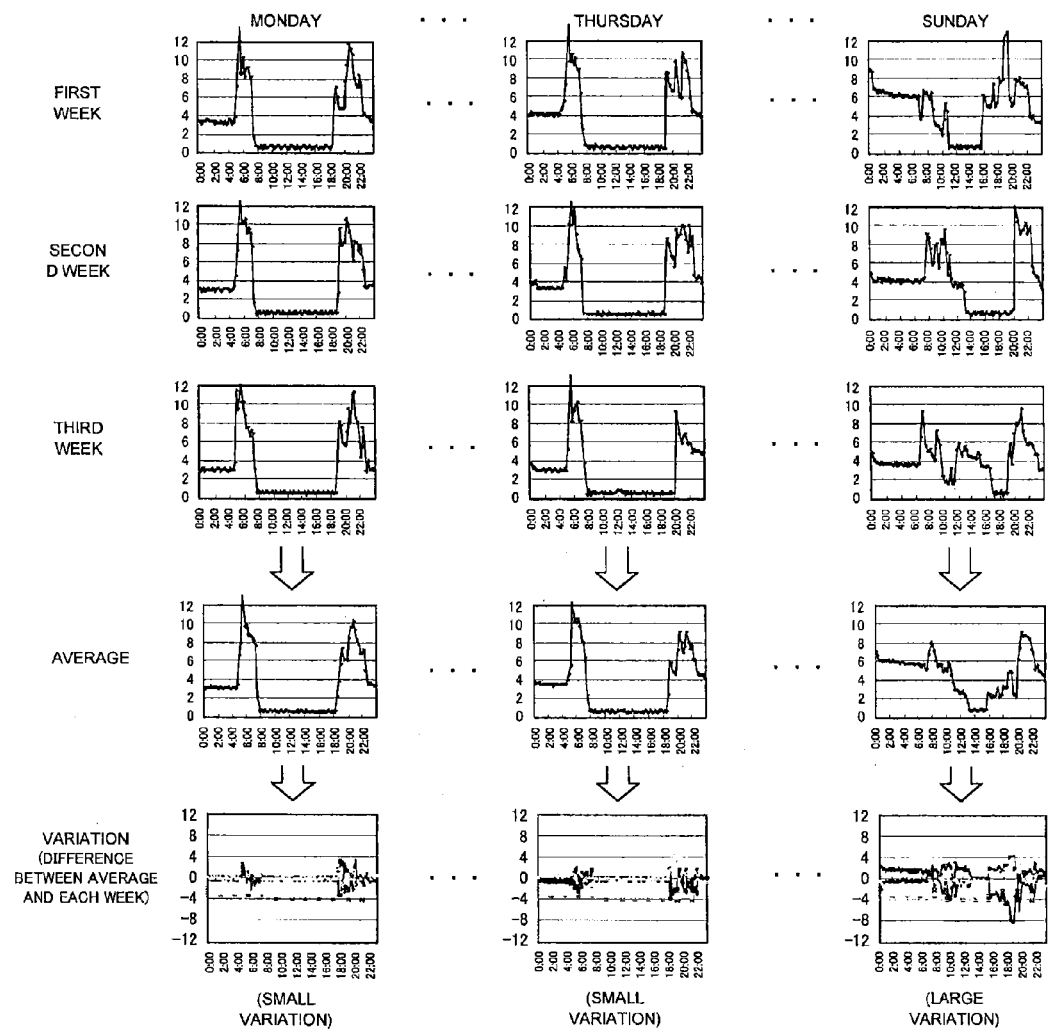
FIG. 6 is a diagram of graphs illustrating power usage patterns in past three weeks, trend graphs acquired by average values of electric energy of each day of the week, and graphs illustrating variations indicating differences between the average values and electric energy of each day of the week.
Figure 7:
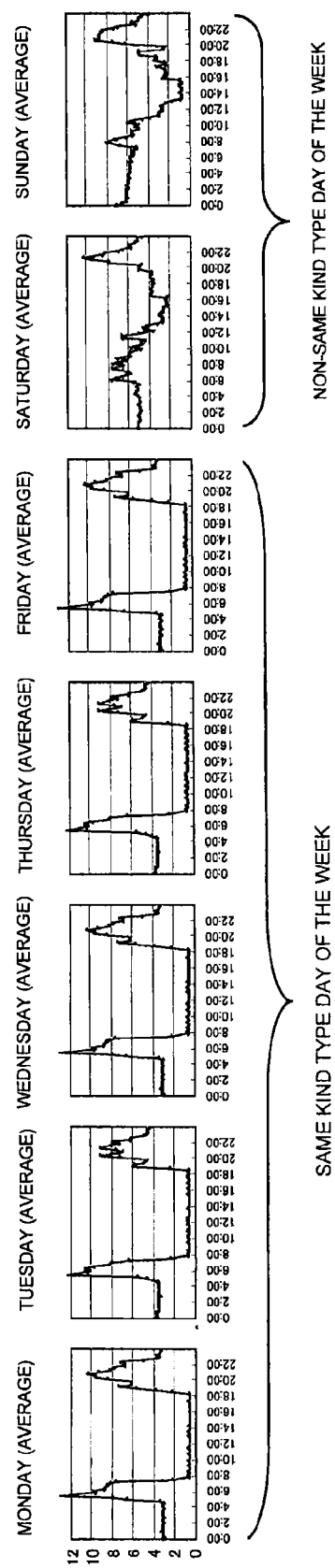
FIG. 7 is a diagram illustrating a result by classification for trend graphs of a same kind type day of the week and trend graphs for a non-same kind type day of the week.
Figure 8:
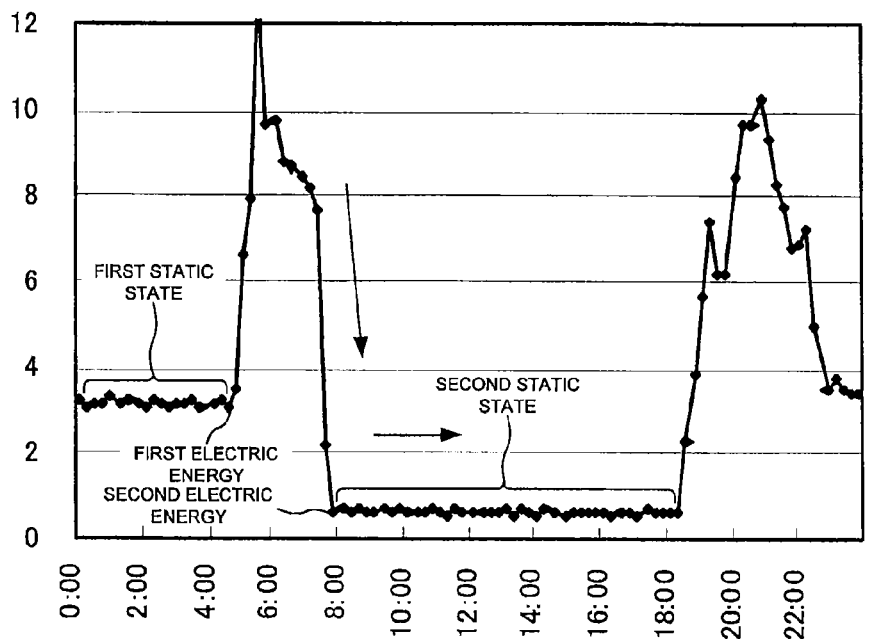
FIG. 8 is a diagram illustrating a trend graph indicating a first static state, a second static state, first electric energy and second electric energy that are acquired from average values for each instant of time on Monday included in the same kind type day of the week.
Figure 9:
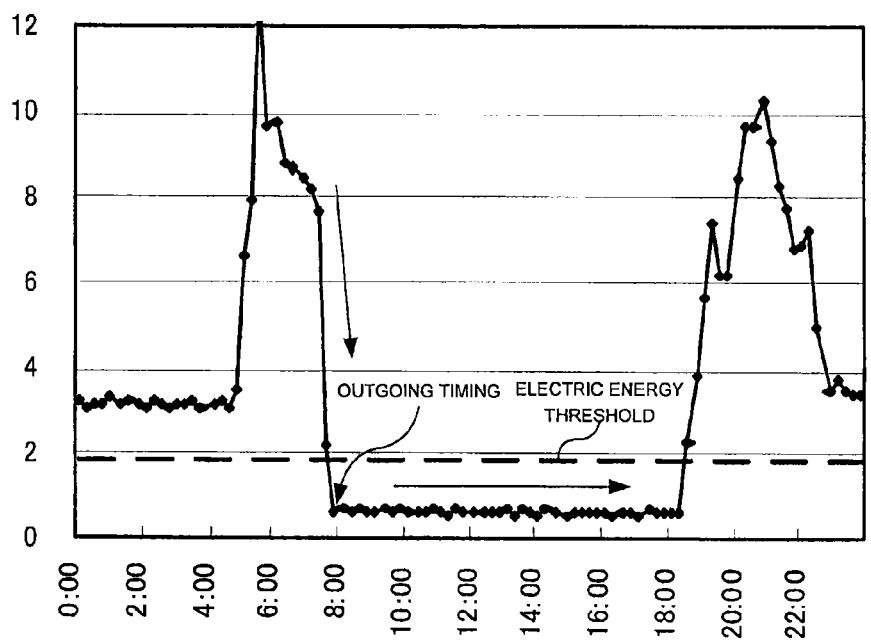
FIG. 9 is a diagram illustrating a trend graph indicating a outgoing timing and an electric energy threshold that are acquired from average values for each instant of time on Monday included in the same kind type day of the week.

A determination operation of outgoing timing will be explained. FIG. 5 is a flowchart illustrating an operation for determining an outgoing timing of the forgetting to turn off power detection apparatus 10 of the embodiments. FIG. 6 is a diagram of graphs illustrating power usage patterns in past three weeks, trend graphs acquired by average values of electric energy of each day of the week, and graphs illustrating variations indicating differences between the average values and electric energy of each day of the week. FIG. 7 is a diagram illustrating a result by classification for trend graphs of a same kind type day of the week and trend graphs for a non-same kind type day of the week. FIG. 8 is a diagram illustrating a trend graph indicating a first static state, a second static state, first electric energy and second electric energy that are acquired from average values for each instant of time on Monday included in the same kind type day of the week. FIG. 9 is a diagram illustrating a trend graph indicating a outgoing timing and an electric energy threshold that are acquired from average values for each instant of time on Monday included in the same kind type day of the week. In the following description, FIGS. 1-4 are referred to as appropriate.

First, the stored data acquisition unit 41 acquires stored data storing electric energy data illustrated in FIG. 3 for past three weeks, from the database 20, and creates a data configuration illustrated in FIG. 4 (S1). The trend graph creation unit 42 creates, as illustrated in FIG. 6, a power usage pattern for each day of the week in first to third weeks from the data configuration (S2). The trend graph creation unit 42 calculates an average value of the electric energy at a day of the week and at a measuring time of the electric energy data, and creates a power usage pattern (trend graph) for each day of the week from the average values (S3).

The trend graph creation unit 42 calculates, for each day of the week, a variation that is a difference between an average value of the electric energy for each instant of time and electric energy for each instant of time for each week, and creates graphs indicating variations of electric energy for each instant of time (S4). In Monday and Thursday illustrated in FIG. 6, a variation is small and regular hours are kept, and those days may be workdays. On the other hand, in Sunday illustrated in FIG. 6, a variation is large and regular hours are not kept, and the day may be holiday. The trend graph creation unit 42 classifies, as illustrated in FIG. 7, electric quantity data and power usage patterns as a same kind type day of the week or a non-same kind type day of the week (S5). As illustrated in FIG. 6, variations of the electric energy of all hours in Monday to Friday fall in a range of ±4 (kWh) and those of day time of the same days fall in a range of ±2 (kWh), and Monday to Friday belong to the same kind type day of the week as illustrated in FIG. 7. On the other hand, variations of the electric energy of almost hours in Saturday and Sunday exceed a range of ±2 (kWh) and those of a specific time of the same days exceed a range of ±4 (kWh), and Saturday and Sunday belong to the non-same kind type day of the week. The same kind type day of the week may be a workday and the non-same kind type day of the week may be a holiday.

The trend graph creation unit 42 acquires, from the database 20 via the stored data acquisition unit 41, data indicating a variation range of electric energy per unit of predetermined time for determining a first static state or a second static state from the database 20 (S6). For example, in the embodiment, a variation range of electric energy per unit of time is defined ±1 (kW), and the range is used to determine a static state. Since a static state is determined based on a variation of electric energy per unit of time, the static state can be precisely and easily determined even if a life pattern of the consumer varies.

The trend graph creation unit 42 calculates, for each same kind type day of the week, a variation of electric energy per unit of time from the average values of electric energy for each instant of time calculated in step 3, determines whether or not the calculated variation of electric energy falls in the variation range of electric energy acquired in step 6. When the calculated variation of electric energy falls in the variation range of electric energy acquired, the time zone within the range is determined as a static state and other time zone is determined as a peak state (S7). As illustrated in FIG. 8, in the trend graph acquired from the average values in Monday of the same kind type day of the week, a variation of electric energy per unit of time in a time zone of 0:00-5:00 falls in ±1 (kW). Consequently, the trend graph creation unit 42 determines that the time zone is a first static state. Likewise, a time zone of 8:00-18:30 is determined as a second static state. A variation of electric energy per unit of time in a time zone of 5:00-8:00 does not fall in ±1 (kW). Consequently, the trend graph creation unit 42 determines that the time zone is a peak state.

The trend graph creation unit 42 calculates an end time of the first static state, that is a measuring time adjacent to the peak stat in the first static state, and calculates a start time of the second static state, that is a measuring time adjacent to the peak state of the second static state (S8). In the trend graph illustrated in FIG. 8, a measuring time just prior to the peak state in the first static state is defined as an end time, and a measuring time just after the peak state in the second static state is defined as a start time. The trend graph creation unit 42, as illustrated in FIG. 8, electric energy of the end time of the first static state is defined as first electric energy, and electric energy of the start time of the second static state is defined as second electric energy.

The electric energy threshold calculation unit 43 calculates an electric energy threshold based on the first electric energy and the second electric energy (S9). For example as illustrated in FIG. 9, a value between the first electric energy and the second electric energy is set as the electric energy threshold. For example, a half value of the sum of the first electric energy and the second electric energy is set as an electric energy threshold. The electric energy threshold is used to detect the forgetting to turn off power by a forgetting turn off power detection unit 52 which is described later. The electric energy threshold calculation unit 43 transmits the set electric energy threshold to the forgetting turn off power detection unit 52 (S10).

The outgoing timing determination unit 44 determines that the start time of the second static state is an outgoing timing (S11). For example, as illustrated in FIG. 9, a start time of 8:00 of the second static state is determined as an outgoing timing. Finally, the outgoing timing determination unit 44 transmits data of the outgoing time to the forgetting turn off power detection unit 52 (S12). The outgoing timing which is the start time of the second static state is used as a start condition to determine forgetting to turn off power detection by the forgetting to turn off power detection unit 50.

(Forgetting to Turn Off Power Detection Operation)

Figure 10:
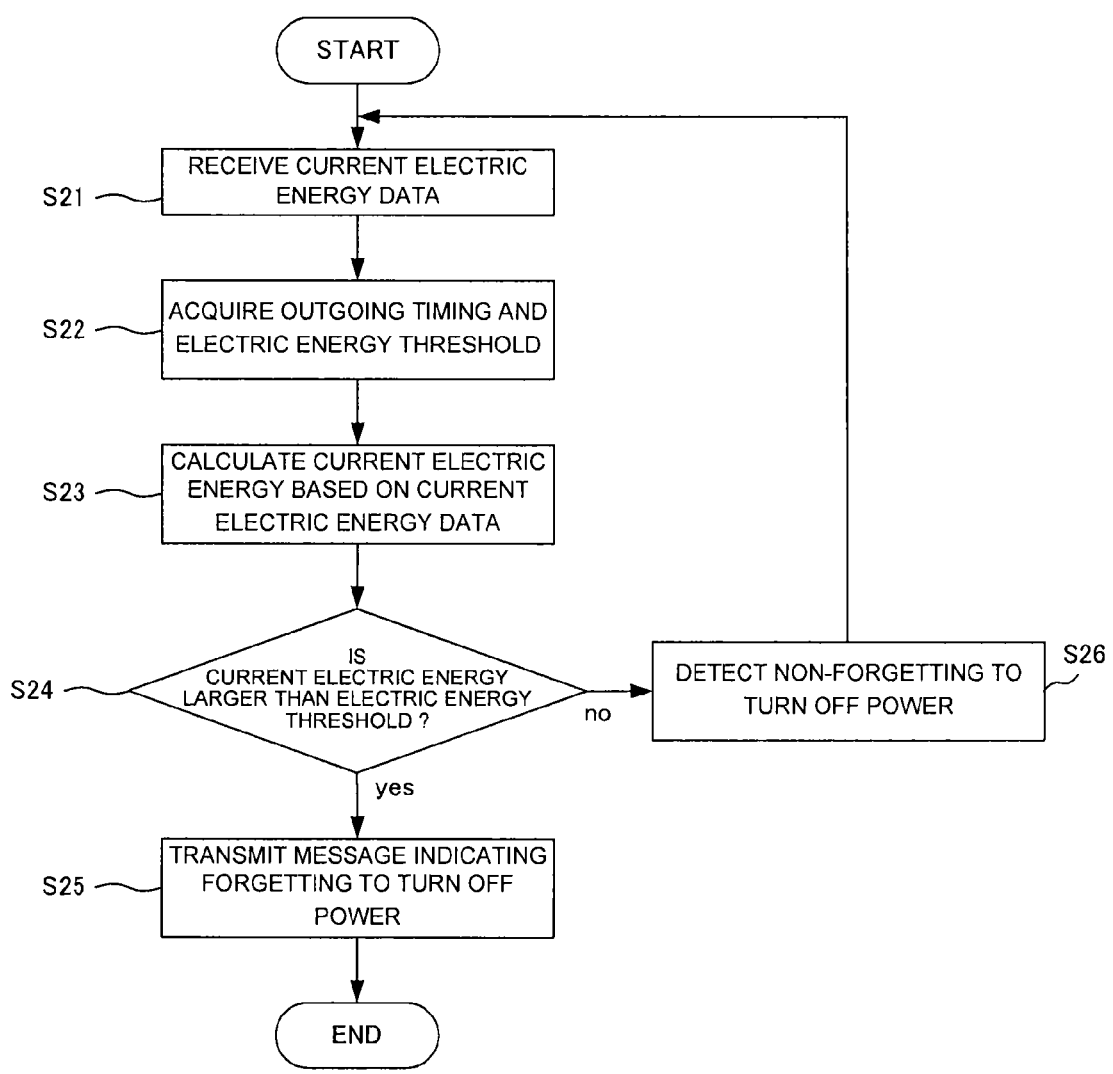
FIG. 10 is a flowchart illustrating a forgetting to turn off power detection operation of the forgetting to turn off power detection apparatus of the embodiment.
Figure 11:
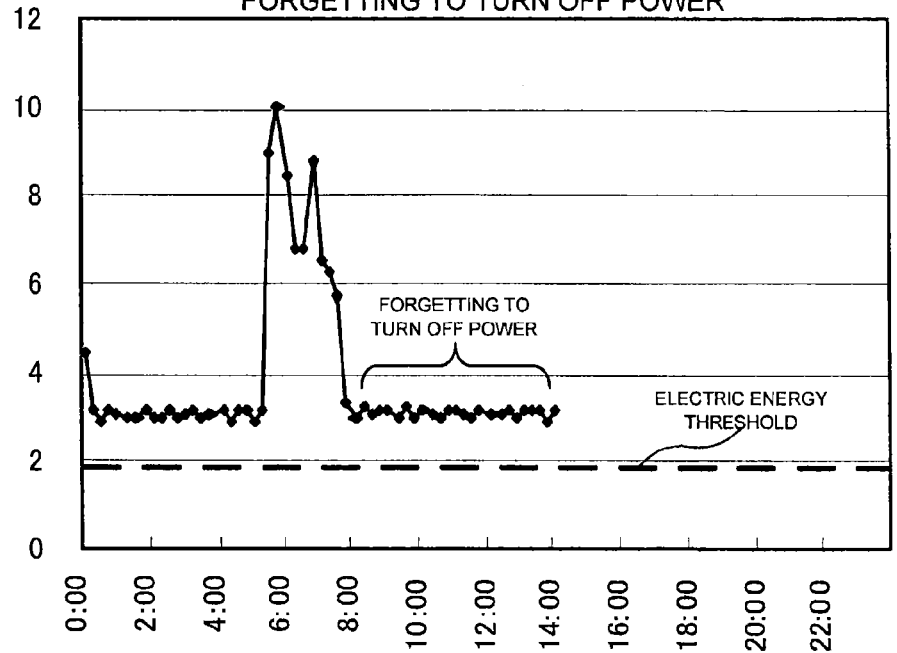
FIG. 11 is a diagram illustrating a graph indicating a relationship between electric energy and time in the case of "occurrence" of forgetting to turn off power.
Figure 12:
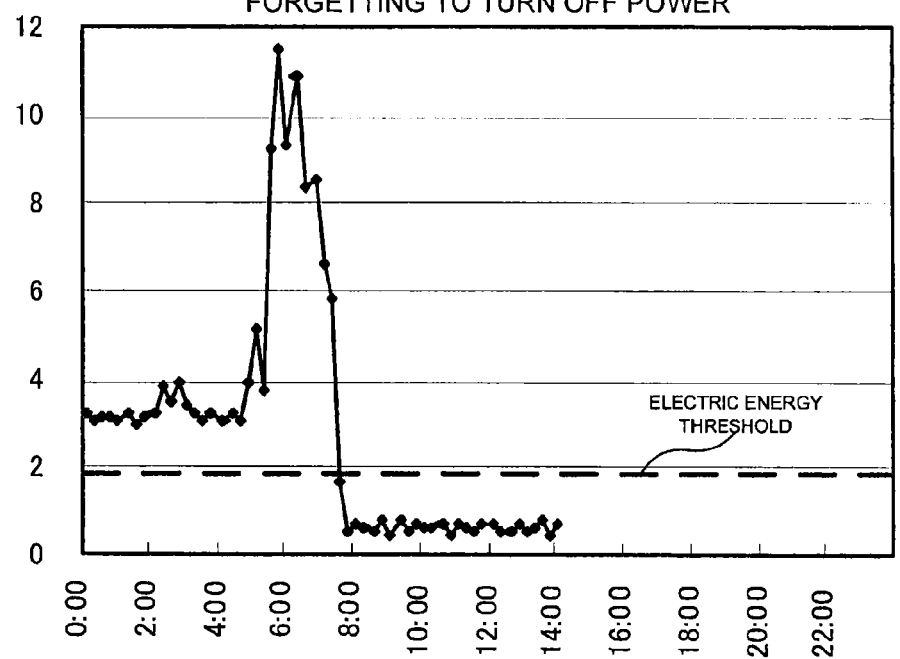
FIG. 12 is a diagram illustrating a graph indicating a relationship between electric energy and time in the case of "absence" of forgetting to turn off power.

A forgetting to turn off power detection operation will be described. FIG. 10 is a flowchart illustrating a forgetting to turn off power detection operation of the forgetting to turn off power detection apparatus 10 of the embodiment. FIG. 11 is a diagram illustrating a graph indicating a relationship between electric energy and time in the case of "occurrence" of forgetting to turn off power. FIG. 12 is a diagram illustrating a graph indicating a relationship between electric energy and time in the case of "absence" of forgetting to turn off power.

A meter data reception unit 51 receives electric energy data (meter data) in the current consumer's home 100 from the smart meter 100a of the consumer's home 100 via the electric power supplier 200 (S21). The meter data reception unit 51 receives the electric energy data at a predetermined interval (such as 30 minutes). The forgetting turn off power detection unit 52 acquires the electric energy threshold from the electric energy threshold calculation unit 43, and acquires the outgoing timing from the outgoing timing determination unit 44 (S22). The forgetting turn off power detection unit 52 calculates electric energy (power consumption) illustrated in FIG. 4 from the current electric energy data illustrated in FIG. 3, and creates the power usage patterns as illustrated in FIGS. 11 and 12 (S23).

The forgetting turn off power detection unit 52 detects whether or not the electric energy after the outgoing timing is larger than the electric energy threshold (S24). Concretely, it is detected that the electric energy after the outgoing timing is kept larger than the electric energy threshold for a predetermined time (for example, one to two hours), for example. When the electric energy after the outgoing timing is larger than the electric energy threshold (S24, yes), the forgetting to turn off power of an electrical household appliance is detected, and a message indicating that is transmitted to the mobile phone 400 via the mail server 30 by the data communication unit 10a (S25). When the electric energy after the outgoing timing is smaller than the electric energy threshold (S24, no), it is detected that the electrical household appliance of the consumer's home 100 is turned off power (S26), and the processing returns to S21.

When the electric energy after 8:00 which is the outgoing timing is larger than the electric energy threshold, for example, as illustrated in FIG. 11, the forgetting turn off power detection unit 52 detects that the forgetting to turn off power of the electrical household appliance in the consumer's home 100. On the other hand, when the electric energy after 8:00 which is the outgoing timing is smaller than the electric energy threshold, for example, as illustrated in FIG. 12, the forgetting turn off power detection unit 52 detects that the electrical household appliance in the consumer's home 100 is turned off power.

According to the forgetting to turn off power detection apparatus 10 of the embodiment, the outgoing timing is automatically determined based on the past electric energy data in the consumer's home 100, and it is detected whether or not the turning off power of the electrical household appliance in the current consumer's home is forgotten, based on the outgoing timing and the electric energy threshold. Therefore, it is determined the outgoing timing of the consumer precisely and it is determined that the forgetting to turn off power of the electrical household appliance, so that it is possible to suppress unnecessary power consumption and to prevent accidents caused by the forgetting to turn off power. Furthermore, since there is no need to install the forgetting to turn off power detection apparatus 10 of the embodiment into the consumer's home 100 as illustrated in FIG. 1, the occurrence of significant cost in the consumer may be suppressed in order for the introduction.

Figure 13:
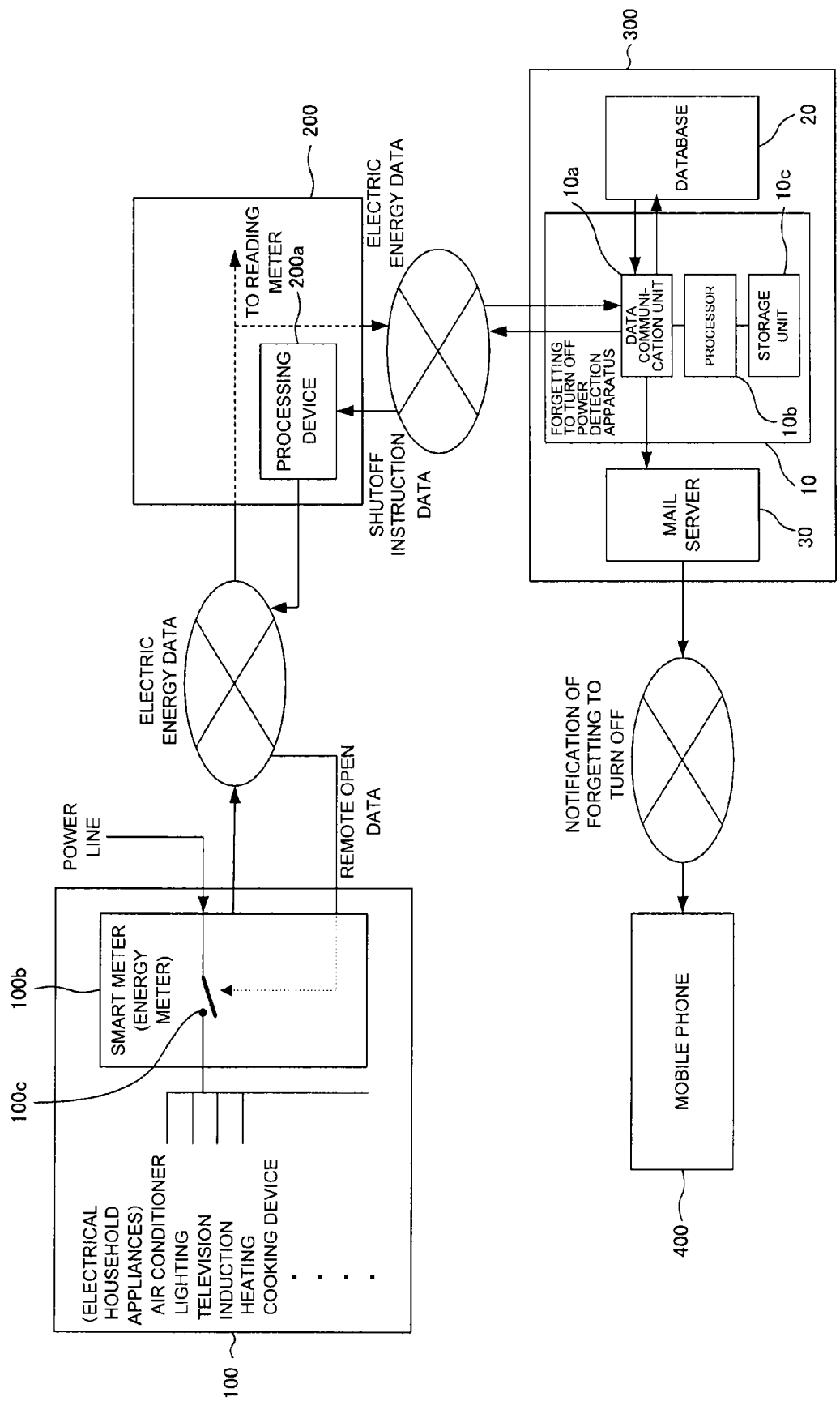
FIG. 13 is a diagram illustrating a system where a conduction shutoff unit of a smart meter is remotely operable in FIG. 1.

Next, a modification of the system including the forgetting to turn off power detection apparatus 10 of the embodiment will be explained. FIG. 13 is a diagram illustrating a system where a conduction shutoff unit 100c of a smart meter 100b is remotely operable. In the system illustrated in FIG. 13, the smart meter 100b in the consumer's home 100 has a conduction shutoff unit 100c. By the introduction of the conduction shutoff unit 100c, when the consumer receives an e-mail of forgetting to turn off power, the consumer does not need to return home or request an acquaintance in the neighborhood to respond the matter in order to shut off the power. When the forgetting to turn off power detection apparatus 10 of the service provider 300 detects the forgetting to turn off power in the consumer's home 100, the forgetting to turn off power detection apparatus 10 transmits shutoff instruction data for the smart meter 100b in the consumer's home 100 to a processing device 200a. The processing device 200a of the electric power supplier 200 receives the shutoff instruction data and transmits remote open data to the smart meter 100b in the consumer's home 100. The smart meter 100b receives the remote open data from the processing device 200a of the electric power supplier 200, shuts off the power supply from the power line, and stops the power supply to the electrical household appliance in the consumer's home 100.

In the system illustrated in FIG. 13, after the consumer receives the email of forgetting to turn off power from the service provider 300 by the mobile phone 400, the consumer performs permission of the conduction shutoff to the service provider 300. Then, the service provider 300 transmits the shutoff instruction data. In FIG. 13, by installing one conduction shutoff unit 100c into each electrical household appliance, only target electrical household appliance for forgetting to turn off power may be shut off.

Figure 14:
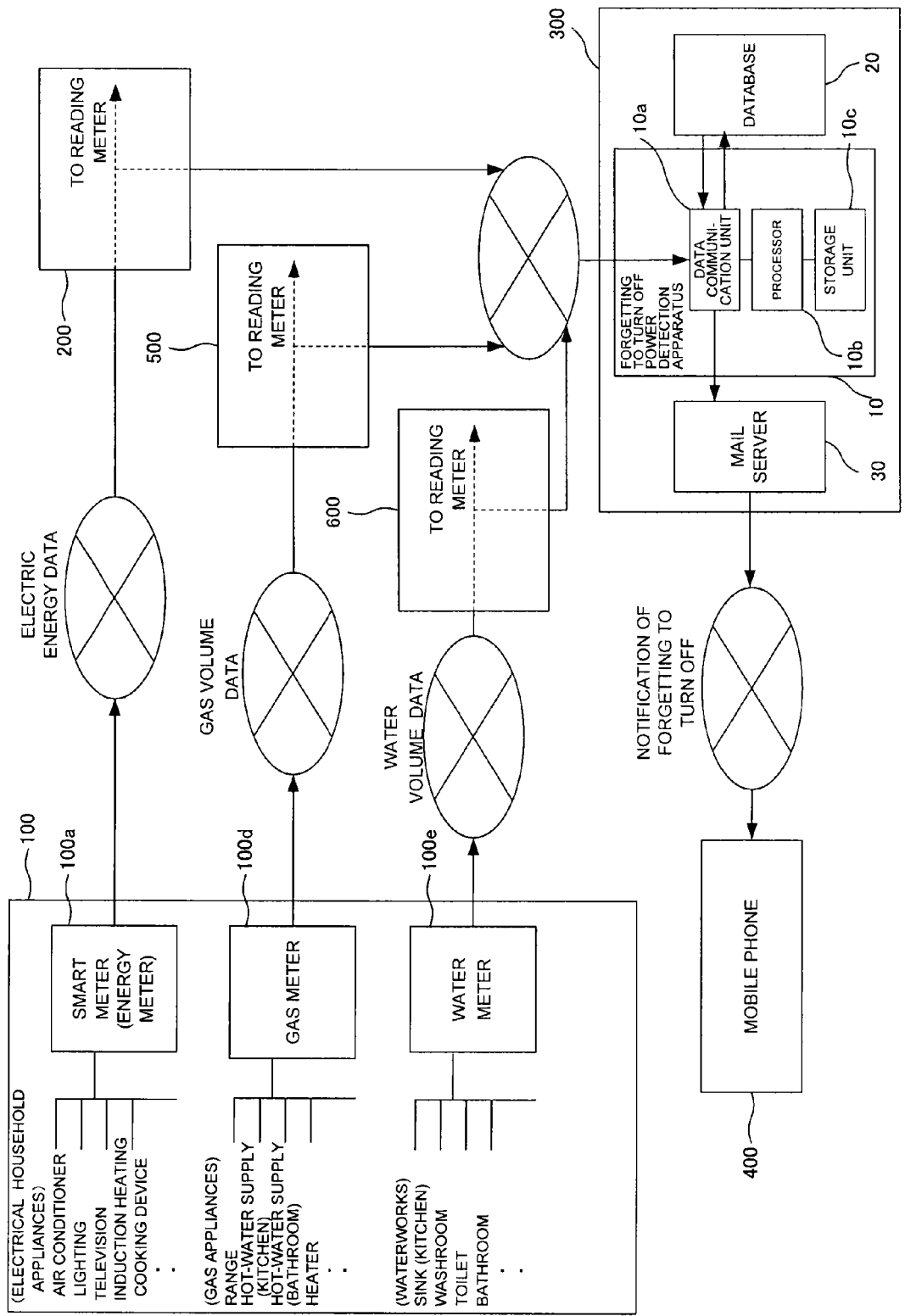
FIG. 14 is a diagram illustrating a system including a consumer's home, an electric power supplier, a gas supplier, a water supplier, a service provider and a mobile phone owned by the consumer.

FIG. 14 is a diagram illustrating a system including the consumer's home 100, the electric power supplier 200, a gas supplier 500, a water supplier 600, the service provider 300 and the mobile phone 400 owned by the consumer. In the system illustrated in FIG. 14, the forgetting to turn off power detection apparatus 10 combines water volume data and gas volume data in addition to the electric energy data, and detects matters regarding whether or not the consumer is in-house state and whether or not there is forgetting to turn off power. In order that, in FIG. 14, the consumer's home 100 includes a gas meter 100d having a communication function and a water meter 100e having a communication function. The forgetting to turn off power detection apparatus 10 receives the water volume data and gas volume data via the water supplier 600 and gas supplier 500, to consider the data. The details are described later. Consequently, the forgetting to turn off power detection apparatus 10 may accurately performs determination of the outgoing timing of the consumer or the forgetting to turn off power when compared with the case of only the electric quantity data used.

Like the energy meter (smart meter) 100a, the gas meter 100d transmits the gas volume data that was used in the consumer's home 100 to the gas supplier 500 via a network of the gas company, for example. Similar to the electric power supplier 200, the gas supplier 500 uses the gas volume data for the measuring and transmits the gas volume data via the communication network to the contracted service provider 300. A forgetting to turn off power detection apparatus 10 of the service provider 300 stores the gas volume data in the database 20 for each consumer. The water meter 100e also transmits the water volume data, and perform the same operation.

For example, as illustrated in the following Table 1, a forgetting to turn off power detection apparatus 10 of the service provider 300 considers the water variation amount and gas variation amount which is calculated from the water volume data and gas volume data, together with the outgoing timing determination unit 44 and the result of the forgetting turn off power detection unit 52, determines whether or not the consumer stays out, and detect whether or not there is the forgetting to turn off power of the electrical household appliance in the consumer's home 100.

TABLE 1

| ELECTRIC ENERGY VALUE | GAS VOLUME DATA, WATER VOLUME DATA | ESTIMATED CONDITION |
| --- | --- | --- |
| SAME VALUE TO NORMAL VALUE | NO CHANGE | STAY OUT, ABSENCE OF FORGETTING TO TURN OFF POWER |
| SAME VALUE TO NORMAL VALUE | CHANGE OCCURS | IN-HOUSE STATE |
| VALUE HIGHER THAN NORMAL VALUE | NO CHANGE | STAY OUT, OCCURRENCE OF FORGETTING TO TURN OFF POWER |
| VALUE HIGHER THAN NORMAL VALUE | CHANGE OCCURS | IN-HOUSE STATE |

As described in Table 1, when a value of the electric energy is the same as the normal and there is no change in the water volume data and gas volume data, it is estimated that the consumer stays out and there is no forgetting to turn off power. When a value of the electric energy is the same as the normal and there is a change in the water volume data and gas volume data, it is estimated that the consumer is in-house state. When a value of the electric energy is higher than normal and there is no change in the water volume data and gas volume data, it is estimated that the consumer stays out and there is the forgetting to turn off power. When a value of the electric energy is higher than normal and there is a change in the water volume data and gas volume data, it is estimated that the consumer is in-house state.

When it is detected that there is the forgetting to turn off power, the forgetting turn off power detection unit 52 of the service provider 300 notifies the forgetting to turn off power to the mobile phone 400 of the consumer via the mail server 30. Consequently, in the system illustrated in FIG. 14, it is possible to detect, in addition to forgetting to turn off power, forgetting shutout of a gas appliance or forgetting to stop water.

Note that in the system illustrated in FIG. 14, the outgoing determination unit 40, as in the electric quantity data, may acquire water volume data and gas volume data in the past, creates a trend graph, calculate a threshold value, and determine the outgoing timing together with the trend graph of the electrical quantity data. In addition, the forgetting to turn off power detection unit 50, in the same manner as forgetting to turn off power detection based on the electric quantity data, may acquire the water volume data and current gas volume data, and detect the forgetting to turn off power based on the threshold value calculated from the current water amount and the current gas volume, and the outgoing timing along with the result of the electric quantity data. Note that both the water volume data and gas volume data, or one of these may be considered.

While, in the forgetting to turn off power detection apparatus 10 of the embodiment, on the basis of the only electric energy data, determination of the outgoing timing of the consumer and detection of the forgetting to turn off power of the electrical household appliance are performed, the gas volume data and the water volume data may be considered in addition to the electric energy data. Specifically, it may be realized by the similar means in the above explanation of FIG. 13.

Furthermore, it is determined only from the power consumption pattern of the past outgoing timing of the embodiment, the consumer may inform the outgoing timing to the service provider 300 in advance. For example, it is possible to set the outgoing timing by accessing to a Web screen provided by the service provider 300 in the mobile phone or the computer by the consumer.

Furthermore, when the consumer goes out, an outgoing timing may be notified to the service provider 300 by e-mail. In this case, the consumer may set a time to be notified as a time after the outgoing, and may input a planed outgoing timing as the outgoing timing into the mobile phone 400 during the in-home state to notify it to the service provider 300 previously. In this case, the mobile phone 400 includes an outgoing timing input unit for entering the outgoing timing and an outgoing timing notification unit for notifying the outgoing timing.

Figure 15:
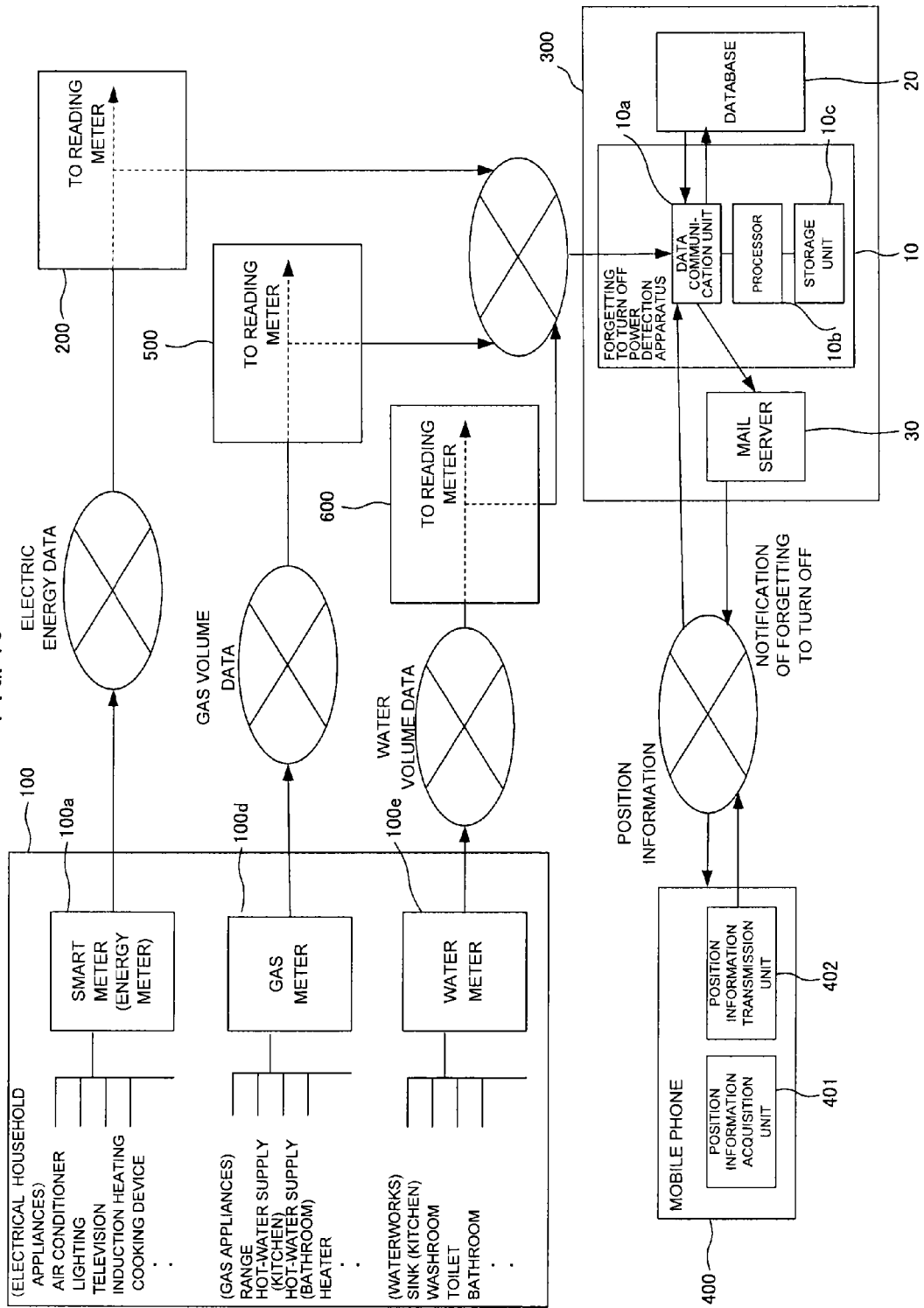
FIG. 15 is a diagram illustrating a system including a consumer's home, an electric power supplier, a gas supplier, a water supplier, a service provider and a GPS locator-equipped mobile phone owned by the consumer.

It is also possible to know the going out of the consumer by the GPS function of the mobile phone 400 and the like. For GPS-equipped cellular phone, the position information acquired by the cellular phone having to GPS is transmitted to the service provider 300. The service provider 300 may set the time getting the position information as the outgoing timing. Even if a vehicle has the GPS function, the service provider 300 may acquire the outgoing timing by the similar means. For example, the GPS-equipped cellular phone, as illustrated in FIG. 15, includes a position information transmission unit 402 to transmit the current position information and position information acquisition unit 401 acquires the current position information, and a vehicle having a GPS function in the same manner. In addition, a vehicle having a GPS function and GPS-equipped cellular phone, may transmit the position information to set time by the timer.

Figure 16:
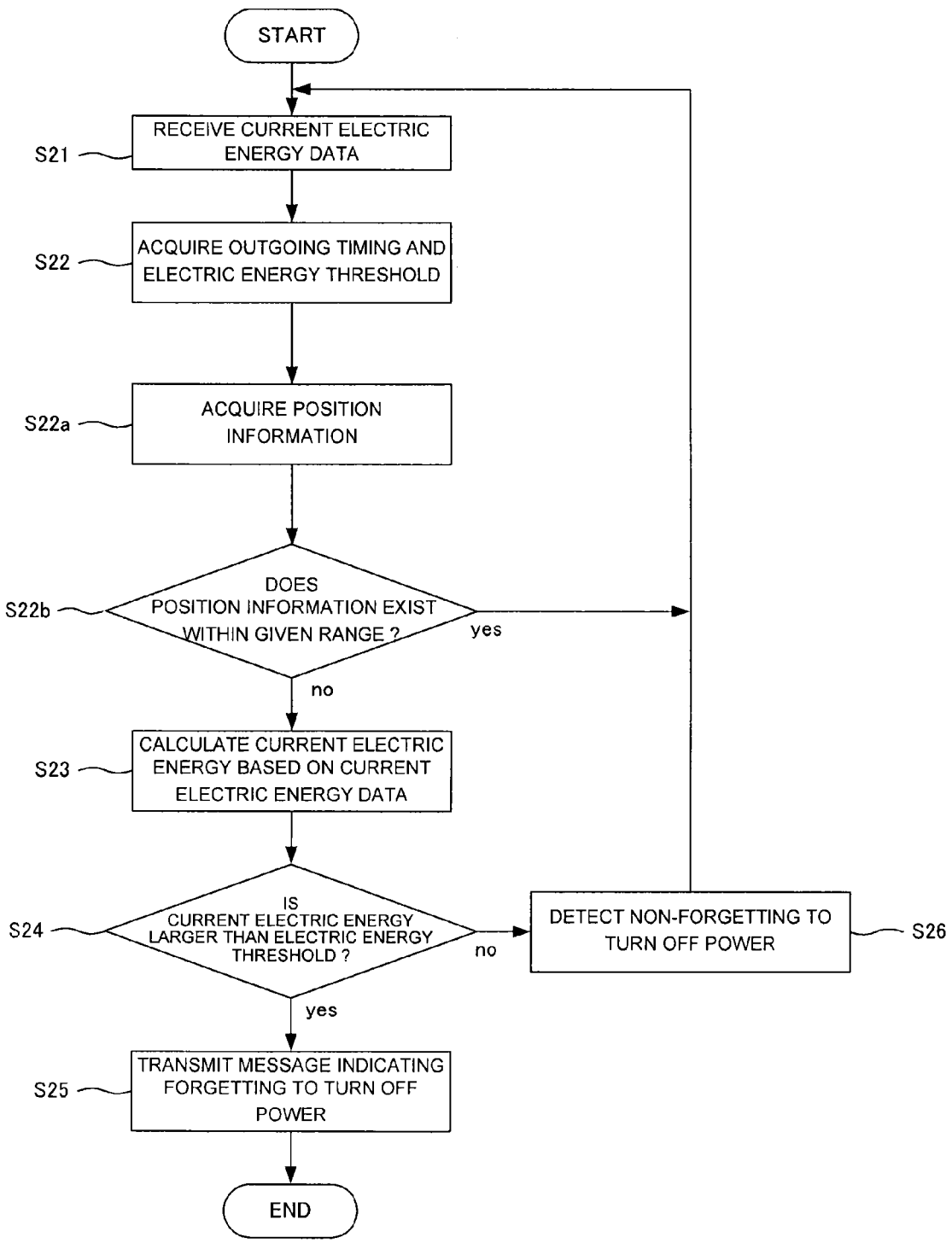
FIG. 16 is a flowchart illustrating a forgetting to turn off power detection operation based on position information.

Forgetting to turn off power detection operation based on the position information by the mobile phone will be explained. FIG. 16 is a flowchart illustrating a forgetting to turn off power detection operation based on the position information. Since the operation of steps S22a and S22b are different with respect to the flowchart illustrated in FIG. 10, only the operation different from that of FIG. 10 in the flow chart illustrated in FIG. 16 will be described.

After the operation of step S22, the outgoing timing determination unit 44 acquires the position information sent from the position information transmission unit 402 (S22a) and determines whether or not a position indicated by the position information falls in a predetermined range (S22b). The range indicates a position within a predetermined distance from the position of consumer's home 100, or a predetermined location range indicating the consumer's home 100. The range is defined in advance. When the position indicated by the position information falls in the predetermined range (S22b, yes), the operation of S21 is performed. When the position indicated by the position information does not falls in the predetermined range (S22b, no), the operation of S23 is performed It is also possible to know the going out of the consumer by transmitting/receiving radio wave conditions with the mobile phone 400. In this case, mobile operators may, according to the area of the mobile phone base station in communication with the mobile phone 400, roughly grasp where the owner of the mobile phone 400 is positioned. Therefore, the outgoing timing determination unit 44 may determine that the consumer carrying the mobile phone 400 goes out, and set the determined time as the outgoing timing.

Figure 17:
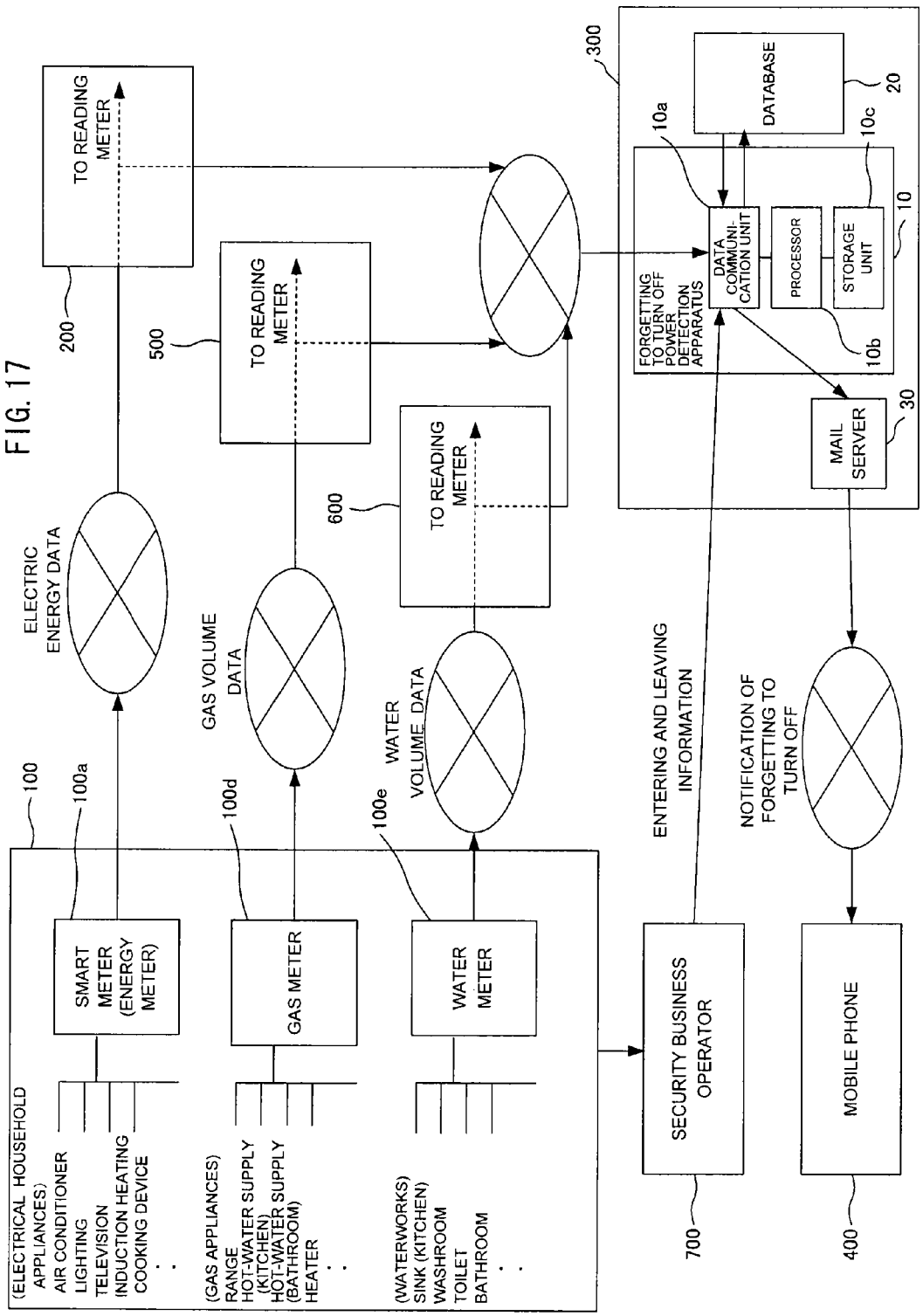
FIG. 17 is a diagram illustrating a system including a consumer's home 100, an electric power supplier 200, a gas supplier 500, a water supplier 600, a security business operator 700, a service provider 300 and a mobile phone 400 owned by the consumer.

In the method of grasping the going outside, when the security information can be available, it is possible to perform the going outside determination of the consumer with greater precision. FIG. 17 is a diagram illustrating a system including a consumer's home 100, an electric power supplier 200, a gas supplier 500, a water supplier 600, a security business operator 700, a service provider 300 and a mobile phone 400 owned by the consumer. Security business operator 700 illustrated in FIG. 17 acquires entering and leaving information from the security device that is equipped in the consumer's home 100, as the security information. In addition, the forgetting to turn off power detection apparatus 10 acquires the entering and leaving information from the security business operator 700. The entering and leaving information, in the information about the security of the consumer's home 100, may be any of information relating to going outside of the consumer. As the entering and leaving information, key lock information, card information of entering and leaving, or security camera information can be applied.

Figure 18:
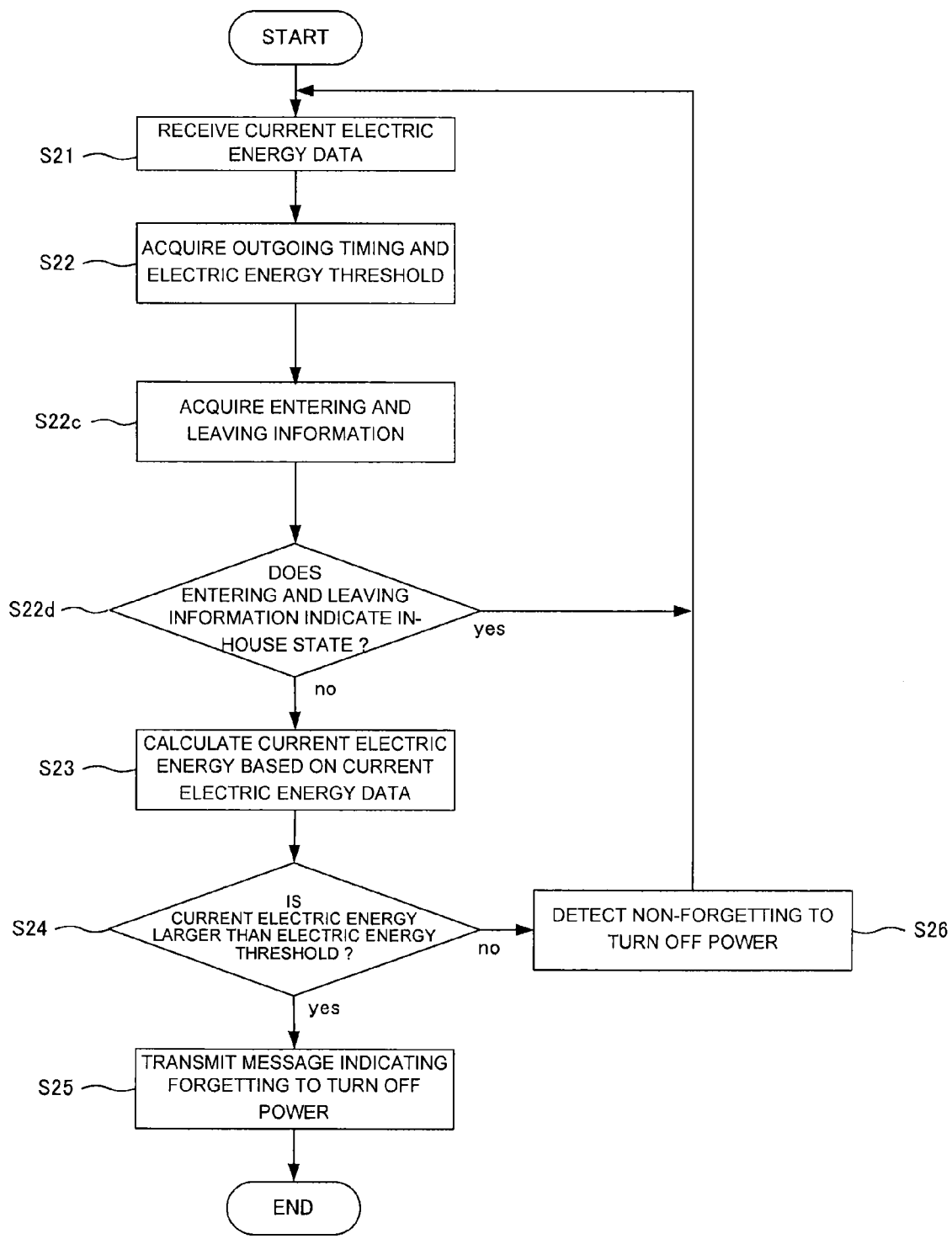
FIG. 18 is a flowchart illustrating a forgetting to turn off power detection operation based on entering and leaving information.

Forgetting to turn off power detection operation based on the entering and leaving information will be explained. FIG. 18 is a flowchart illustrating a forgetting to turn off power detection operation based on the entering and leaving information. Since the operation of steps S22c and S22d are different with respect to the flowchart illustrated in FIG. 10, only the operation different from that of FIG. 10 in the flow chart illustrated in FIG. 18 will be described.

After the operation of the step S22, the outgoing timing determination unit 44 acquires the entering and leaving information from the security business operator 700 (S22c), and determines whether or not the entering and leaving information indicates the in-home state of the consumer (S22d). As a condition indicating the in-home state, key lock information indicates the door of the consumer's home 100 have been locked, the card entering and leaving information indicates entering the room to the consumer's home 100, or the security camera information including an entry state of the consumer's home 100 of the consumer by using such as face recognition based on the security camera, indicates an entering state. When the entering and leaving information indicates the in-home state of the consumer (S22d, yes), the operation of S21 is performed. When the entering and leaving information indicates the stay out state of the consumer (S22d, no), the operation of S23 is performed.

The determination of whether or not the consumer's home 100 is in a peopleless state based on the entering and leaving information and the usage patterns of resources may be combined with determination based on the position information of the consumer and the patterns of resource use as described above. It is possible to determine whether or not the consumer's home 100 is in a peopleless state, more accuracy, based on the entering and leaving information, the position information and the usage pattern for each resource.

In the embodiments, while the service provider 300 includes the database 20, the electric power supplier 200 may include the database 20. Similarly, the service provider 300 includes the forgetting to turn off power detection apparatus 10 in the embodiments, but the electric power supplier 200 may include the forgetting to turn off power detection apparatus 10, or the consumer's home 100 may include the forgetting to turn off power detection apparatus 10.

While the message transmission unit 53 transmits the result of the forgetting turn off power detection unit 52 to the consumer via the mail server 30 in the embodiments, the trend graphs created by the trend graph creation unit 42, the electric energy threshold calculated by the electric energy threshold calculation unit 43, the electric energy data of the current consumer's home 100 received by the meter data reception unit 51 and the like may be transmitted to the consumer via the mail server 30. Consequently, the consumer may detect the forgetting to turn off power based on the data.

Furthermore, the consumer, by accessing to the Web page provided by the service provider 300 from the mobile phone 400, may recognize the trend graphs created by the trend graph creation unit 42, the electric energy threshold calculated by the electric energy threshold calculation unit 43, the electric energy data of the current consumer's home 100 received by the meter data reception unit 51 and the like. Therefore, the consumer may detect the forgetting to turn off power based on the data.

While the forgetting to turn off power of the electrical household appliance is explained in the embodiments, the invention may be applied to forgetting to turn off power of electric equipment in the consumer's home 100 except the electrical household appliances.

The service provider 300 in the embodiment may be the same of the electric power supplier 200, the gas supplier 500 or the water supplier 600. In addition, a company for providing energy such as hot and cold water, may be do the same of that.

While It is referred to the conduction shutoff only in the embodiments, the shutoff against the forgetting to turn off power may be performed according to the usage amount of resources, in resources of energy such as gas, water, and the like, in the same manner as the electrical energy. When controls except the open/close control may be performed, control such as temperature control of an air conditioner and light control of the lighting may be accomplished.

The forgetting to turn off power program for allowing the processor 10b to execute the functions of the outgoing determination unit 40 and the forgetting to turn off power detection unit 50 may be stored in a computer-readable medium. The computer-readable recording medium includes a disk and a semiconductor memory. The type of the medium includes a storage unit 10c which is disposed inside of the forgetting to turn off power detection apparatus 10, a portable recording medium, other external storage device of the forgetting to turn off power detection apparatus. When the portable recording medium stores the forgetting to turn off power detection program and the forgetting to turn off power detection apparatus 10 includes a reading device of the portable recording medium, the forgetting to turn off power detection apparatus 10 may read the forgetting to turn off power detection program from the medium. Alternatively, when the other computer stores the forgetting to turn off power detection program, and the forgetting to turn off power detection apparatus 10 is connected to the computer, the forgetting to turn off power detection apparatus 10 may receive the forgetting turn off power detection program from the computer.

While a general household is explained as a consumer in the embodiments, the invention may be applied to the management of electric power, etc in night or on holidays when the building or the factory is in the peopleless state. That is, the embodiments may target not only the consumer's home in the general household, but also the consumer equipment such as buildings and factories. Furthermore, the embodiment may target an apartment which plural consumer's homes are attached to, and may be applied to each of the plural consumer's homes.

While certain embodiments have been described, these embodiments have been presented by way of example only, and are not intended to limit the scope of the inventions. Indeed, the novel embodiments described herein may be embodied in a variety of other forms: furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A forgetting to turn off power detection apparatus comprising:
    an outgoing determination unit that creates a power usage pattern based on electric energy that is calculated from past electric energy data in a consumer equipment, and determines whether or not a consumer has gone outside based on the power usage pattern; and
    a forgetting to turn off power detection unit that receives current electric energy data in the consumer equipment, and detects forgetting to turn off power of an electric equipment of the consumer equipment based on the received electric energy data when the outgoing determination unit determines that the consumer has gone outside.

2. The forgetting to turn off power detection apparatus according to claim 1, wherein
    the outgoing determination unit calculates an average value of electric energy at a predetermined interval based on the past electric energy data, and determines whether or not the consumer has gone outside based on a power usage pattern created from a same kind type of electric energy after classifying the electric energy at a predetermined interval as the same kink type of electric energy or a non-same kink type of electric energy based on a difference between the average value and the electric energy at a predetermined interval.

3. The forgetting to turn off power detection apparatus according to claim 2, wherein
    the power usage pattern includes a first static state and a second static state in time sequence, where a variation of electric energy per unit time falls within a predetermined range, and
    the outgoing determination unit sets an electric energy threshold for forgetting to turn off power detection based on the first static state and the second static state.

4. The forgetting to turn off power detection apparatus according to claim 2, wherein
the outgoing determination unit calculates a start time of the second static state as a start condition for start detection by the forgetting to turn off power detection unit, and determines the start time as a time when the consumer has gone outside.

5. The forgetting to turn off power detection apparatus according to claim 1, wherein
the outgoing determination unit determines whether or not the consumer has gone outside based one selected from the power usage pattern, a variation amount that is acquired from past gas volume data of the consumer equipment, and a variation amount that is acquired from a past water volume data of the consumer equipment.

6. The forgetting to turn off power detection apparatus according to claim 1, wherein
the forgetting to turn off power detection unit detects forgetting to turn off power of the electric equipment of the consumer equipment when data, in electric energy calculated from the current electric energy data, at a time later than a determined time when the consumer has gone outside, is larger than a threshold value that is set based on a power usage pattern created from electric energy calculated from the past electric energy data.

7. A forgetting to turn off power detection program stored on a non-transitory computer readable medium causing a computer to execute the steps comprising:
a going outside determination step that create a power usage pattern based on electric energy calculated from past electric energy data in a consumer equipment, and determines whether or not a consumer has gone outside based on the power usage pattern; and
a forgetting to turn off power detection step that receives current electric energy data in the consumer equipment, and detects forgetting to turn off power of an electric equipment of the consumer equipment based on the received electric energy data when the going outside determination step determines that the consumer has gone outside.

8. A forgetting to turn off power detection method comprising:
creating a power usage pattern based on electric energy calculated from past electric energy data in a consumer equipment, and determining whether or not a consumer has gone outside based on the power usage pattern; and
receiving current electric energy data in the consumer equipment, and detecting forgetting to turn off power of an electric equipment of the consumer equipment based on the received electric energy data when it is determined that the consumer has gone outside.

9. A detection system comprising:
a determination unit that creates a usage pattern calculated from at least one piece of data in past plural resource usage amounts in consumer equipment, and determines whether or not the consumer equipment is in a peopleless state based on the usage pattern;
a detection unit that receives at least one piece of data in current plural resource usage amounts in the consumer equipment, detects a usage state of a resource corresponding to received usage amount data in plural resources of the consumer equipment at a timing when it is determined that the consumer equipment is in the peopleless state by the determination unit, based on at least one piece of data in the received plural resource usage amounts when it is determined that the consumer equipment is in the peopleless state by the determination unit; and
a control unit that performs predetermined control for a resource of which the detection unit detects a usage state, in the plural resources based on a detected state of the detection unit.

10. The detection system according to claim 9, wherein
the determination unit acquires at least one piece of information of entering and leaving management information from the consumer equipment and position information of the consumer, and determines whether or not the consumer equipment is in the peopleless state based on the at least one piece of information acquired by the determination unit and the usage pattern.

* * * * *